May 2, 1961 J. R. ENRIGHT 2,982,169
TEST PROCEDURE FOR DETERMINING EXTENT OF
VISIBLE DEPOSITS ON SURFACES
Filed April 19, 1957

A. PHOTOGRAPH ENTIRE PERIPHERAL SURFACE OF CLEAN CYLINDER.

B. PHOTOGRAPH ENTIRE PERIPHERAL SURFACE OF:
 1. TOTALLY CONTAMINATED CYLINDER.
 2. PARTIALLY CONTAMINATED CYLINDER.
 UNDER IDENTICAL CONDITIONS AS THE FIRST PHOTOGRAPH.

C. DEVELOP PHOTOGRAPHIC NEGATIVES UNDER IDENTICAL CONDITIONS.

D. MEASURE AND COMPARE THE LIGHT TRANSMITTANCE OF THE PHOTOGRAPHIC NEGATIVES.

E. RATIO OF TRANSMITTANCES:
$$\frac{B(2)-A}{B(1)-A} \times 100$$
EQUALS PER CENT OF SURFACE CONTAMINATION OF PARTIALLY CONTAMINATED CYLINDER.

FIG. 1

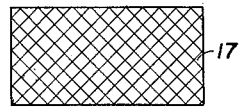

FIG. 4

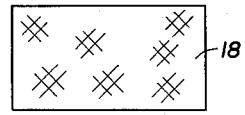

FIG. 5

FIG. 6

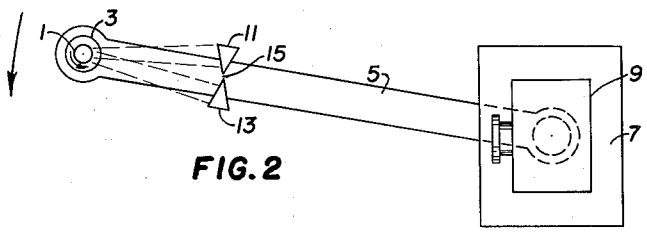

FIG. 2

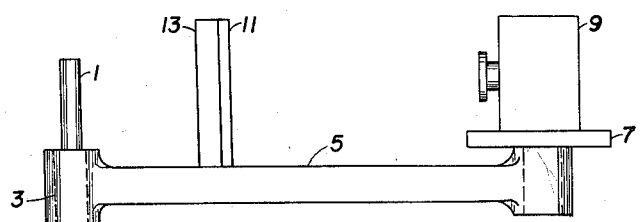

FIG. 3

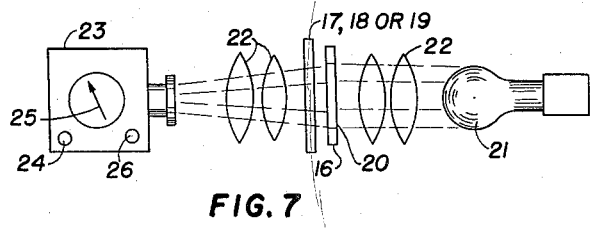

FIG. 7

INVENTOR.
JOHN R. ENRIGHT
BY
ATTORNEY

United States Patent Office 2,982,169
Patented May 2, 1961

2,982,169

TEST PROCEDURE FOR DETERMINING EXTENT OF VISIBLE DEPOSITS ON SURFACES

John R. Enright, Lake Zurich, Ill., assignor to The Pure Oil Company, Chicago, Ill., a corporation of Ohio Filed Apr. 19, 1957, Ser. No. 653,875

2 Claims. (Cl. 88—14)

This invention relates to new and useful testing methods and more particularly to a method of determining the extent of surface contamination of metal surfaces which become covered and contaminated with deposits of various kinds.

In the operation of internal combustion engines, valve lifters, pistons, and other cylindrical objects frequently become partially coated with deposits of various kinds during use. It is desirable in experimental work with internal combustion engines to determine the extent of the accumulation of the deposits (e.g., carbonaceous deposits, metal deposits, and the like) during engine tests of various lubricants, fuels, etc. It is necessary to determine accurately the extent of the accumulation of deposits on the parts of an internal combustion engine in order to evaluate the relative effectiveness of lubricants, fuels, etc. in reducing the formation of such deposits. In the past, the evaluation of the surface contamination of engine parts has been made by visual observation of the parts, which has resulted in considerable variation in interpretation by different individuals with consequent inconsistencies in the reported results.

It is, therefore, one object of this invention to provide a simple and accurate method of determining the degree of accumulation of deposits on a metal surface.

A feature of this invention is the provision of a method of measuring the extent of contamination of a partially contaminated surface by photographing the surface and comparing the photograph obtained, with reference photographs of a clean surface and a totally contaminated surface taken and developed under identical conditions, with the difference in light transmittance of the photographs being a measure of the degree of contamination of the partially contaminated surface.

Another feature of this invention is the provision of a process for determining the extent of carbonaceous and other deposits on cylindrical metal engine parts by photographing the entire pheripheral surface of such parts and comparing the light transmittance of the photograph with the transmittance of reference photographs of a clean cylindrical metal surface and a completely coated cylindrical metal surface taken and developed under identical conditions. A photoelectric light-intensity meter is used to measure light transmittance of the photographs, and the relative difference in light transmittance represents the degree of contamination of the surface of the cylinder being measured.

Other objects and features of this invention will become apparent from time to time throughout the specification and claims as hereinafter related.

In the accompanying drawings, to be taken as part of this specification, there is clearly and fully illustrated a preferred embodiment of this invention, in which drawings Fig. 1 is a schematic flow diagram setting forth the steps of this test procedure, Fig. 2 is a schematic plan view of the apparatus for photographing the surface of a metal cylinder for evaluating the extent of contamination, Fig. 3 is a schematic view in elevation of the apparatus shown in Fig. 2, Fig. 4 is a schematic plan view of a reference photograph obtained by photographing a clean metal cylinder using the apparatus shown in Figs. 2 and 3.

Fig. 5 is a schematic plan view of a photograph of a metal cylinder having deposits thereon, Fig. 6 is a schematic plan view of a photograph of a metal cylinder having a maximum permissible coating of deposits thereon, and, Fig. 7 is a schematic view showing a light source and a photoelectric light-intensity meter arranged to measure light transmittance of the respective photographic films of Figs. 4, 5, and 6.

This invention consists of a method of measuring the extent of contamination of a surface which comprises separately photographing a clean reference surface and a totally contaminated surface of the same size, shape, color and texture as the surface to be measured. The contaminated surface to be measured is then photographed using the same film and using identical optical and lighting conditions. The negatives are then developed under identical conditions and measured for light transmittance. The ratio of differences in transmittance of light by the photographs of the partially and totally contaminated surfaces (relative to the clean surface) is a direct measure of the degree of contamination of the partially contaminated surface which is measured by this method.

In this method, a clean reference member or test element, such as a hydraulic valve lifter, is photographed so that an image of its entire surface is recorded on a single photographic negative. It is usually desirable to have this image as small as possible, as, for example, on 35 mm. film. In carrying out this process, reference member 1 is supported on rotary supporting member 3 on pivotally mounted arm 5. Arm 5 is pivotally mounted under support 7 for camera 9. On arm 5 there is mounted a pair of light reflectors, 11 and 13, which are arranged to focus light on test member 1 and which have slot 15 therebetween through which the surface of test member 1 is viewed by camera 9.

Supporting arm 5 and rotary support 3 are arranged so that arm 5 may be moved in the direction of the large directional arrow, and support 3 may be rotated in the direction of the small rotary directional arrow. When test member 1 is placed on rotary support 3 and lights 11 and 13 focused on the surface of member 1, the apparatus is in condition to photograph the surface of the test member. The shutter of camera 9 is opened and arm 5 is moved in the direction of the large directional arrow while rotary support 3 is rotated in the direction of the small directional arrow. As arm 5 moves test member 1 and support 3 rotates that member, the entire peripheral surface of test member 1 is photographed in a single image on the film in camera 9. Photographic negative 17 in Fig. 4 shows the surface of the clean reference cylinder (and is cross-hatched to illustrate a black negative).

A second reference member is then placed in the photographic apparatus to obtain a reference negative. The second reference member is a cylinder of the same type as test member 1 which is either totally coated with the undesirable deposits or coated with the deposits to a predetermined maximum permissible amount. The negative 19 obtained in this step is substantially clear, as shown in Fig. 6.

When it is desired to test a member of the same type as test member 1, which has a partial coating of carbonaceous or metallic or other deposits thereon, the member to be measured is placed on rotary support 3 and its entire peripheral surface photographed in the same manner as was just described for the photographing of the first and second reference members. The photographing of the contaminated surface of the member to be measured is carried out under identical conditions of lighting, lens setting, time of exposure, etc., using the same film and under identical conditions as the photographing of the reference members. Photographic negative 18 obtained by photographing such a contaminated surface is lighter than that obtained in photographing the clean reference surface, as shown in Fig. 5.

Because of the extreme difficulty in correcting for variations in the test procedure, it is extremely important that all of the photographic steps be accurately reproduced during the comparative tests. Similarly, the development of the reference films and the film of the member which is being measured must be carried out under identical conditions.

Photographic negatives 17, 18 and 19, which are produced in photographing the peripheral surfaces of the reference members and the member which is to be measured, are individually placed between light 21 and photoelectric light-intensity meter 23 to measure the light transmittance, which is indicated on a suitable indicating dial, 25. Lenses 22 are provided to focus the light from light source 21. Wall member 16 having aperture 20 is provided to define the light beam passing through the photographic negative. The light meter may be provided with knobs 24 and 26 which adjust the minimum and maximum readings (for the clean and totally coated reference members, respectively) to 0 and 100, respectively. The transmittance of film 18 minus the transmittance of reference film 17 divided by the transmittance of reference film 19 minus the transmittance of reference film 17 multiplied by 100 represents the percent contamination of the measured surface.

From this description it is seen that this apparatus and test method provides an accurate method of measuring the relative amounts of surface contamination of engine parts. By using this method and apparatus, different parts can be compared after periods of use with different fuels or lubricants and the extent of surface contamination measured. A showing of less contamination of a part when used with one lubricant or fuel, relative to its use with other lubricants or fuels, is an indication of the superiority of that particular lubricant or fuel.

It should be noted that while the apparatus and test method have been described with special emphasis upon the testing and measuring of contamination of cylindrical surfaces, it is equally applicable to other surfaces. Thus, square or hexagonal rods, or even irregularly shaped surfaces, can be measured for surface contamination in a similar manner. In applying this process to other shaped parts, it is merely necessary to photograph separately clean and totally contaminated reference surfaces and compare the light transmittance thereof with a photograph of the surface of a partially contaminated member. As in the principal embodiment of this invention, the reference surfaces must be of the same size, shape, color, and surface texture as the metal surface of the contaminated member which is being measured.

What is claimed is:

1. A method for determining the extent to which visible deposits are formed on the surface of a test piston used in an internal combustion engine, said deposits and said surface having differing reflectancies to light, comprising photographing separately a clean piston, a piston used in an internal combustion engine operated under conditions to totally foul the surface thereof with deposits, and a piston used in an internal combustion engine under test conditions to partially foul the surface thereof with deposits, said surfaces being of the same color, size, and surface texture; by rotating each piston and simultaneously therewith moving it across the field of view of a camera while maintaining the speed of rotation of the piston such that the peripheral speed thereof is equal and opposite to the speed of movement of said piston, and blocking from the field of view of the camera all of the surface of the piston except a narrow longitudinal band lying between the axis of the piston and the camera, to produce separate single photographic negatives of the entire peripheral surface of each piston, each piston being photographed with identical film and under identical optic conditions, developing the negatives under identical conditions, and measuring the light transmittance of the negatives by separately passing identical beams of light therethrough and onto a photoelectric light intensity meter, whereby the extent to which visible deposits are formed on the surface of the piston employed in the engine operated under test conditions may be determined by dividing the light transmittance of the negative of the partially surface fouled piston minus the light transmittance of the negative of the clean piston by the light transmittance of the negative of the totally fouled piston minus the light transmittance of the negative of the clean piston.

2. A method in accordance with claim 1 in which said deposits are carbonaceous deposits.

References Cited in the file of this patent

UNITED STATES PATENTS

| | | |
|---|---|---|
| 1,501,856 | Lee | July 15, 1924 |
| 2,076,554 | Drinker et al. | Apr. 13, 1937 |
| 2,244,507 | Thomas | June 3, 1941 |
| 2,487,112 | De Koning | Nov. 8, 1949 |
| 2,495,703 | Dennis | Jan. 31, 1950 |
| 2,509,316 | Savin et al. | May 30, 1950 |
| 2,725,782 | Worley | Dec. 6, 1955 |

FOREIGN PATENTS

| | | |
|---|---|---|
| 8,686 | Great Britain | of 1899 |
| 552,398 | Great Britain | Apr. 6, 1943 |

OTHER REFERENCES

Walsh text on Photometry, 1926; pages 331–333, 391, 392, 393, 427, and 428.

"New Methods for the Evaluation and Recording of Piston-Skirt Deposits," Society of Automotive Engineers Journal (Transactions), vol. 51, No. 2, February 1943, pages 38–44 and page 63, Luck et al.

Laundry Age: Howell's article on How to Start a Washing Formula; April 1, 1945, pages 30, 34, and 35.

"The Photography of Surface Details of Glossy Panels," The Photographic Journal, vol. 91B, May–June 1951, pages 67–72, Luck et al.

Industrial and Engineering Chemistry: Compton et al., article on Soiling and Soil Retention in Textile Fibers, vol. 43; July 1951, pages 1564–1569.